US011122048B2

(12) United States Patent
Akselrod et al.

(10) Patent No.: US 11,122,048 B2
(45) Date of Patent: Sep. 14, 2021

(54) USER PROFILE ACCESS FROM ENGAGING APPLICATIONS WITH PRIVACY ASSURANCE ASSOCIATED WITH AN API (71) Applicant: International Business Machines Corporation, Armonk, NY (US)

(72) Inventors: Ben Z. Akselrod, Givat Shmuel (IL); Gal A. Shachor, Yokneam (IL); Anton Aleksandrov, Austin, TX (US); Moty Drimer, Safed (IL); Nitzan Nissim, Byniamina (IL)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 16/142,397

(22) Filed: Sep. 26, 2018

(65) Prior Publication Data
US 2020/0099691 A1 Mar. 26, 2020

(51) Int. Cl.
*H04L 29/06* (2006.01)
*H04W 12/06* (2021.01)
*H04L 29/08* (2006.01)

(52) U.S. Cl.
CPC .......... *H04L 63/102* (2013.01); *H04L 63/083* (2013.01); *H04L 63/107* (2013.01); *H04L 67/02* (2013.01); *H04W 12/06* (2013.01)

(58) Field of Classification Search
CPC ..... H04L 63/102; H04L 63/083; H04L 67/02; H04L 63/107; H04L 63/0807; H04W 12/06; H04W 12/63
See application file for complete search history.

(56) References Cited

U.S. PATENT DOCUMENTS

| 9,313,193 | B1 | 4/2016 | Mehta et al. | |
|---|---|---|---|---|
| 9,736,159 | B2 | 8/2017 | Shah et al. | |
| 2014/0040993 | A1* | 2/2014 | Lorenzo | G06F 21/41 726/4 |
| 2015/0135275 | A1* | 5/2015 | Matsugashita | H04L 63/104 726/4 |
| 2016/0006693 | A1* | 1/2016 | Salcedo | H04L 63/0236 726/1 |
| 2017/0111336 | A1* | 4/2017 | Davis | H04L 67/02 |
| 2017/0331832 | A1* | 11/2017 | Lander | H04L 63/0807 |
| 2018/0077138 | A1* | 3/2018 | Bansal | H04L 63/0815 |
| 2020/0007535 | A1* | 1/2020 | Barhudarian | H04L 63/0853 |

OTHER PUBLICATIONS

Schindelhaim, Carmel, "New in App ID—Let Users Sign-up and Sign-in to your Apps with an Email and Password", IBM Cloud Blog, Grace Period Disclosure, Nov. 27, 2017, <https://www.ibm.com/blogs/bluemix/2017/11/new-app-id-let-users-sign-sign-apps-email-password/>, 10 pages.

* cited by examiner

*Primary Examiner* — Henry Tsang
(74) *Attorney, Agent, or Firm* — Monchai Chuaychoo (57) ABSTRACT

An approach to secure API access for distinct types of users. A request for access to an API from a user is initiated and followed by sending a request for a login credential to the user based on a type of API requested: Data API or Interaction API. The login credential is received along with the network location of the user. Authenticating the login credential and create an API specific token. Assigning the API specific token to a user activity and granting the user access to the specific API.

17 Claims, 8 Drawing Sheets

USER PROFILE ACCESS FROM ENGAGING APPLICATIONS WITH PRIVACY ASSURANCE ASSOCIATED WITH AN API

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
1) Incorporated into International Business Machine's Cloud Blog, "New in App ID—Let Users Sign-up and Sign-in to your Apps with an Email and Password", Nov. 27, 2017

BACKGROUND OF THE INVENTION

The present invention relates generally to the field of internet software and more particularly to internet access security technology.

Web services using API (Application Programming Interface) has been the norm for various web functionality. However, nefarious agents and attackers can compromise those APIs. Currently, when web services provide a solution that works with applications, a two-level access mechanism, user and admin (Administrator), is required. Typically, access to the applications by either a user or an admin goes through the same entry point. The user can do only user related tasks such as CRUD (Create, Read, Update and Delete) operations on its own preferences and data, while the admin needs access to all the user's preferences and data for account service, analytics, and other purposes. This poses a great risk, since the admin permission allows the admin to perform CRUD operations on all the individual user preferences and data. If the admin credentials are compromised, the entire system is compromised as well. Further, based on the user access visibility in the application user interface, attackers tend to target the user access and then look for ways to gain admin permissions for the user access.

Therefore, realizing a need for a secured method for users and admins to access web-based APIs has a broad and fundamental interest in internet security technologies.

SUMMARY

According to an embodiment of the present invention, a computer implemented method for securing API access for different types of users, the computer implemented method comprising: receiving, by one of more processors, a request for access to an API (Application Programming Interface) from a user; sending, by the one of more processors, a request for a login credential to the user based on a type of API requested; receiving, by the one of more processors, the login credential from the user; authenticating, by the one of more processors, the login credential; responsive to authenticating the login credential, creating, by the one of more processors, an API token, and assigning, by the one of more processors, the API token to a user activity associated with the login credential validation and based on a predetermined network location; and granting, by the one of more processors, the user access to the API based on the API token.

According to another embodiment, a computer program product for securing API access for different types of users, the computer program product comprising: one or more computer readable storage devices and program instructions stored on the one or more computer readable storage devices, the stored program instructions comprising: program instructions to receive a request for access to an API (Application Programming Interface) from a user; program instructions to send a request for a login credential to the user based on a type of API requested; program instructions to receive the login credential from the user; program instructions to authenticate the login credential; responsive to authenticating the login credential, program instructions to create an API token, and program instructions to assign the API token to a user activity associated with the login credential validation and based on a predetermined network location; and program instructions to grant the user access to the API based on the API token.

According to another embodiment, a computer system for securing API access for different types of users, the computer system comprising: one or more computer processors; one or more computer readable storage devices; program instructions stored on the one or more computer readable storage devices for execution by at least one of the one or more computer processors, the stored program instructions comprising: program instructions to receive a request for access to an API (Application Programming Interface) from a user; program instructions to send a request for a login credential to the user based on a type of API requested; program instructions to receive the login credential from the user; program instructions to authenticate the login credential; responsive to authenticating the login credential, program instructions to create an API token, and program instructions to assign the API token to a user activity associated with the login credential validation and based on a predetermined network location; and program instructions to grant the user access to the API based on the API token.

DETAILED DESCRIPTION

Embodiments of the present invention recognize that improvements to secured web service access via APIs can be realized by using a segregated approach for calls to APIs coupled with a token authentication system.

This approach involves separating the two types of actions (i.e., API calls) performed by a user and by an admin (Administrators) into separate APIs with a separate credential system and ACL (access control list) system. The admin API can only be accessed from a highly secure server-side application with limited entry and a limiting scope denoted by an ACL subsystem coupled with a token system, while the user API is accessible from a client app with the right user access token and scoped only to the specific user's data. The term invoke/invoking is synonymous with "call to API", "utilize API", "request to API", or "API calls" in this disclosure.

Embodiments of the present invention can be realized in unique and flexible authentication systems that include token assignments that separates the two types of REST (REpresentation State Transfer) APIs into an Interaction/Engagement API for a user and a Data API for an admin. Both unique and novel APIs (e.g., Data API 112 and Interaction API 113) will be described in further detail in FIG. 1B, FIG. 2B and FIG. 3B. Another advantage of separating the access to the two APIs is that it allows for increased security, while being flexible when offering customer facing capabilities.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1A:
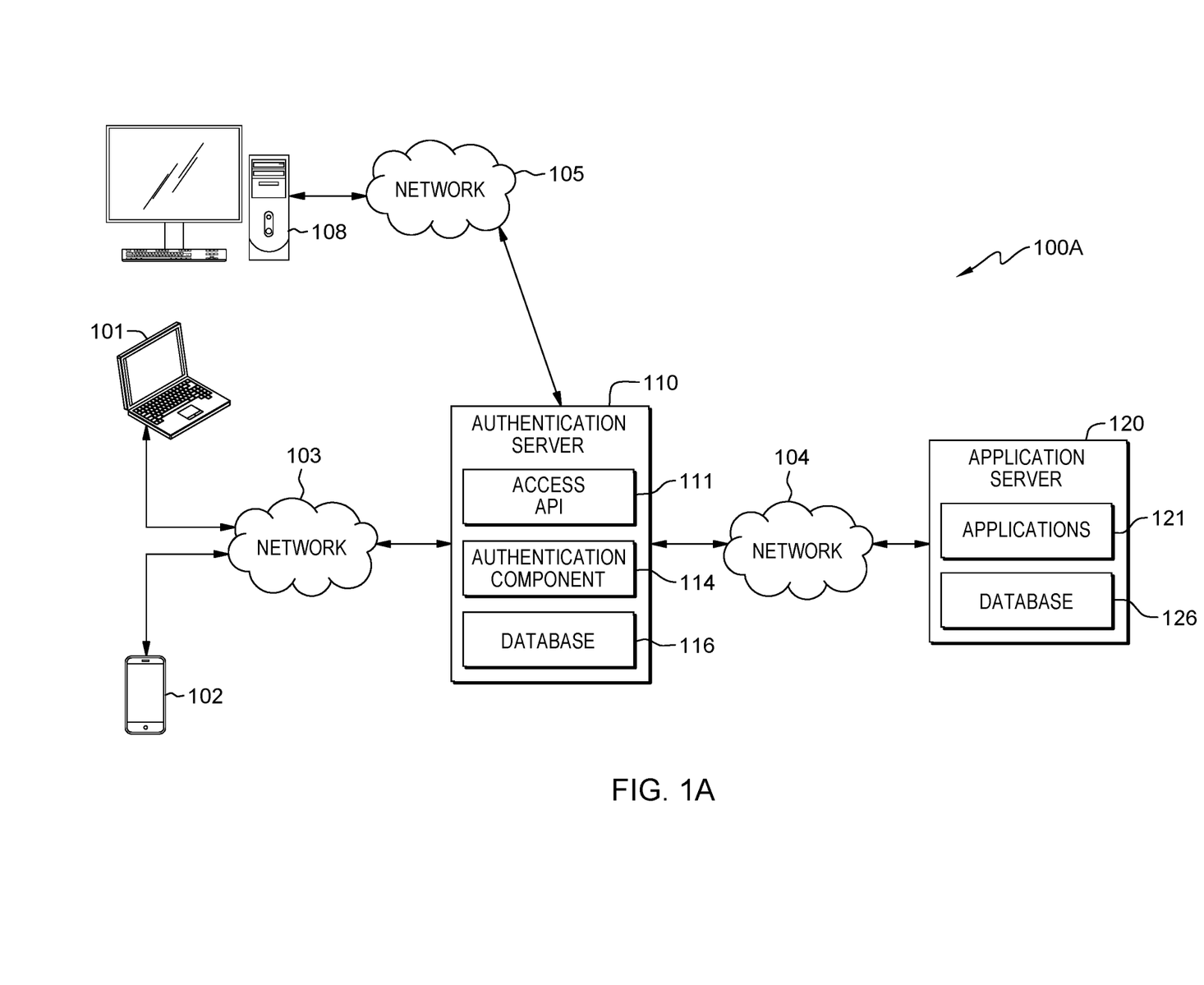
FIG. 1A is a functional block diagram illustrating the one portal access for two APIs environment, designated as 100A, in accordance with an embodiment of the present invention.

FIG. 1A is a functional block diagram illustrating the one portal access for two APIs 100A, in accordance with an embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

One portal access for two APIs 100A includes authentication server 110, application server 120, client computer 101 and mobile device 102, all interconnected over public facing network 103, private network 104 and highly secured network 105.

Client computer 101 can be any electronic device or computing system capable of receiving, sending, and processing data. Client computer 101 allows the users (e.g., customers) to access the web services (or any other suitable applications) on application server 120 via authentication server 110.

Mobile device 102 can be a mobile computing device, or any other electronic device or computing system capable of receiving, sending, and processing data. Mobile device 102 allows the users (or admins) to access the web services (or any other suitable applications) on application server 120 via authentication server 110.

Secured computer 108 can be any electronic device or computing system capable of receiving, sending, and processing data. Secured computer 108 allows the users (or admins) to access the web services (or any other suitable applications) on application server 120 via authentication server 110. It is noted that secured computer 108 can have another layer of authentication for administrators or any users requiring stricter security.

Public network 103 can be, for example, a telecommunications network, a local area network (LAN), a wide area network (WAN), such as the Internet, or a combination of the three, and can include wired, wireless, or fiber optic connections. Public network 103 can include one or more wired and/or wireless networks that are capable of receiving and transmitting data, voice, and/or video signals, including multimedia signals that include voice, data, and video information. In general, public network 103 can be any combination of connections and protocols that can support communications between authentication server 110, application server 120, mobile device 102, client computer 101 and other computing devices (not shown) within one portal access for two APIs 100A. In this embodiment, public network 103 faces the outside world and does not reside within an internal or intranet network. In other embodiment, public network 103 can be another layer of network within an organization.

Private network 104 and highly secured network 105 can be, for example, a telecommunications network, a local area network (LAN), a wide area network (WAN). In this embodiment of 100A, private network 104 and highly secured network 105 does not face the outside world but reside within an internal or intranet network. In other embodiment, private network 104 can be another layer of network within an organization. In general, private network 104 and highly secured network 105 can be any combination of connections and protocols that can support communications between authentication server 110, application server 120, secured computer 108 and other computing devices (not shown) within one portal access for two APIs 100A. It is noted that highly secured network 105 can include predetermined IP addresses that allow client devices with those addresses to be only accessible on highly secured network 105.

Authentication server 110 can be a standalone computing device, a management server, a web server, a mobile computing device, or any other electronic device or computing system capable of receiving, sending, and processing data. In other embodiments, authentication server 110 can represent a server computing system utilizing multiple computers as a server system, such as in a cloud computing environment. In another embodiment, authentication server 110 can be a laptop computer, a tablet computer, a netbook computer, a personal computer (PC), a desktop computer, a personal digital assistant (PDA), a smart phone, or any other programmable electronic device capable of communicating with application server 120, and other computing devices (not shown) within 100A via network 103. In another embodiment, authentication server 110 represents a computing system utilizing clustered computers and components (e.g., database server computers, application server computers, etc.) that act as a single pool of seamless resources when accessed within one portal access for two APIs 100A. In general, authentication server 110 provides the ability to grant or deny access for users trying to utilize resources including application server 120 within a closed loop network (e.g., private network 104). Authentication server includes access API 111, authentication component 114 and database 116.

Access API 111 enables the present invention to manage and handle API access based on the correct token and credentials. In the depicted embodiment, access API 111 contains two REST APIs: Data API 112 and Interaction API 113. Furthermore, Access API 112 can separate the two types of actions performed by the user and by an admin into two separate APIs (e.g., two separate credential system and ACL systems). The admin API can only be used to from a highly secure sever side application (e.g., highly secured network 105) with a limited entry and a limiting scope denoted by an ACL subsystem, while the user API is accessible from a client application (e.g., public network 103) with the right user access token and scoped only to the specific user's data. This effectively creates two different APIs (e.g., Data API 112 and Interaction API 113), with a different token and ACLs systems and effectively prevents leakage of information via the user APIs. For example, these two APIs (i.e., Data API 112 and Interaction API 113) will be discussed in greater details in the FIGS. 1B and 1C.

Authentication component 114 enables embodiments to authenticate users based on their login credentials and grants specific tokens to users based on their credentials and other information (e.g., login location, etc.). Furthermore, authentication component 114 can manage ACL systems associated with users and admins. Authentication component 114 can use any well-known techniques for HTTP authentication and including other functionalities such as, but not limited to, token assignment and encrypted cookies.

Database 116 is a repository for data used by access API 111. In the depicted embodiment, database 116 resides on authentication server 110. In another embodiment, database 116 may reside elsewhere within 100A, provided that access API 111 has access to database 116. Database 116 can store a list of pre-determined network locations to be used by authentication component 114. The pre-determined network location list contains allowable network locations that would be considered safe/hacker proof such as highly secured network location 105 or private network 104. The list may contain network locations that are not considered safe/hackable (i.e., not highly secured network location) such as public facing network 103. The list of pre-determined network locations is user selectable and can be updated dynamically. It is noted that access API 111 can determine network locations based on IP (Internet Protocol) address, domain name, browser cookies, etc. to track the location of the user. Any well-known method in the art can be used to track a network location of a user.

Database 126 is a repository for data used by application server 120. In the depicted embodiment, database 126 resides on authentication server 110. In another embodiment, database 126 may reside elsewhere within 100A, provided that access API 111 has access to database 126.

Database 116 and database 126 can be implemented with any type of storage device capable of storing data and configuration files that can be accessed and utilized by authentication server 110, such as a database server, a hard disk drive, or a flash memory. Database 116 and database 126 uses one or more of a plurality of techniques known in the art to store a plurality of information. For example, database 116 may store information associated with the various ACLs, tokens or passwords associated with the users and admins. Furthermore, database 126 may store information related to sales data, customer information and accounting information for an organization.

Application server 120 provides web services and applications (e.g., word processing, spreadsheet or database applications) on a network. In another embodiment, application server 120 can host other internet-related services such as video streaming, machine learning, and social media platforms. Furthermore, application server 120 can be a standalone computing device, a management server, a web server, a mobile computing device, or any other electronic device or computing system capable of receiving, sending, and processing data. In other embodiments, application server 120 can represent a server computing system utilizing multiple computers as a server system, such as in a cloud computing environment. In another embodiment, application server 120 can be a laptop computer, a tablet computer, a netbook computer, a personal computer (PC), a desktop computer, a personal digital assistant (PDA), a smart phone, or any other programmable electronic device capable of communicating with authentication server 110, client computer 101 and other computing devices (not shown) within 100A via private network 104. Application server 120 includes applications 121 and database 126.

Applications 121 (e.g., word processing, spreadsheet or database applications) is a set of general purpose software/program commonly utilized in daily operations of a company. For example, Floo Airline uses accounting software to report the financial statements and word processing software to create memorandums and documents for their clients. In other words, applications 121 can be any set of off-the-shelf or custom software products that allow a company to run its daily business operations.

Figure 1B:
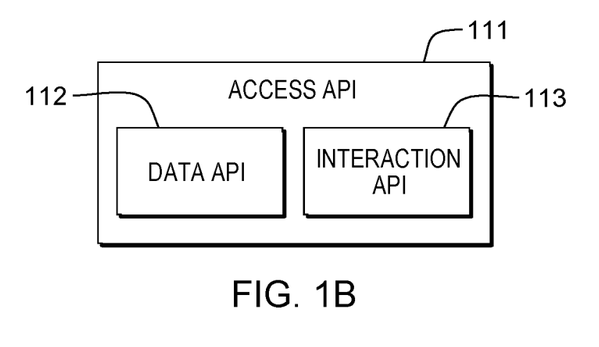
FIG. 1B is a functional block diagram illustrating the use of implementing Data API and Interaction API as part of a single authentication server environment in accordance with 100A.

FIG. 1B is a functional block diagram illustrating the use Data API 112 and Interaction API 113 as part of a single authentication server environment in accordance with 100A. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

Access API 111 includes Data API 112 and Interaction API 113. For illustrative purposes, a use-case scenario involving a fictitious airline (e.g., Airline Floo) will be used throughout the disclosure. It should be noted that the user-case of Airline Floo can represent one or more embodiments and does not diminish other types of use-cases involving security access to web related services.

Access API 111 contains two publicly facing APIs (i.e., Data API 112 and Interaction API 113) that are both used by the web and mobile applications. Access API 111 may utilize any existing method of authentication system (i.e. login credentials and token assignment, etc.) to assist with calling those two APIs.

Data API 112, generally, can be categorized as a REST API. However, more specifically, it can be a specialized REST API that can include the following programming functions:

/customers/history/stats
/customers/currencies/

Furthermore, those programming functions can be configured to be accessible only from within a highly secured server (i.e., located within highly secured network location 105), and only with specifically scoped authentication tokens. For example, Floo Airlines can force each API to have a different token or require the token will expire after a predetermined number of uses. If the authentication token is compromised, only the admin's attributes will be under risk and the admin may have limited or no access to a customer's profile (i.e., seat preference, credit card, etc.).

Interaction API 113, generally, can be categorized as a REST API. However, more specification, it is a specialized REST API that can include the following programming functions:

/users/pref/currency
/users/search/history

These programming functions can be used with HTTP CRUD operations to store, create, delete, and read the attribute in order to provide the customer with an omni channel experience. For example, using Airline Floo usecase, Airline Floo has a client mobile application and website that allows users to purchase tickets, save credit card information and set a few seat preferences (e.g., aisle versus window seat), and preferred currency (e.g., USD vs Euro). Additionally, any search done in either channels are saved in the user's attributes so that search history is visible in both web and mobile application. If the authentication token is compromised, only this customer's attributes will be under risk.

Figure 1C:
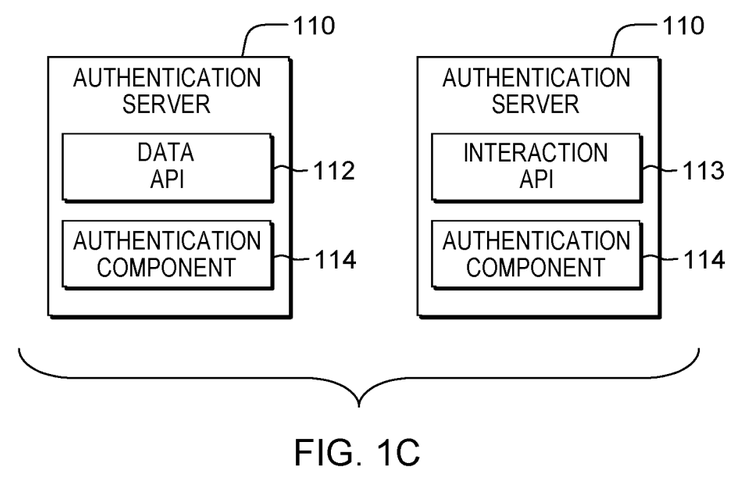
FIG. 1C is a functional block diagram illustrating the individual APIs (Data API and Interaction API) residing in a single authentication server environment in accordance with another embodiment of the present invention.
Figure 2B:
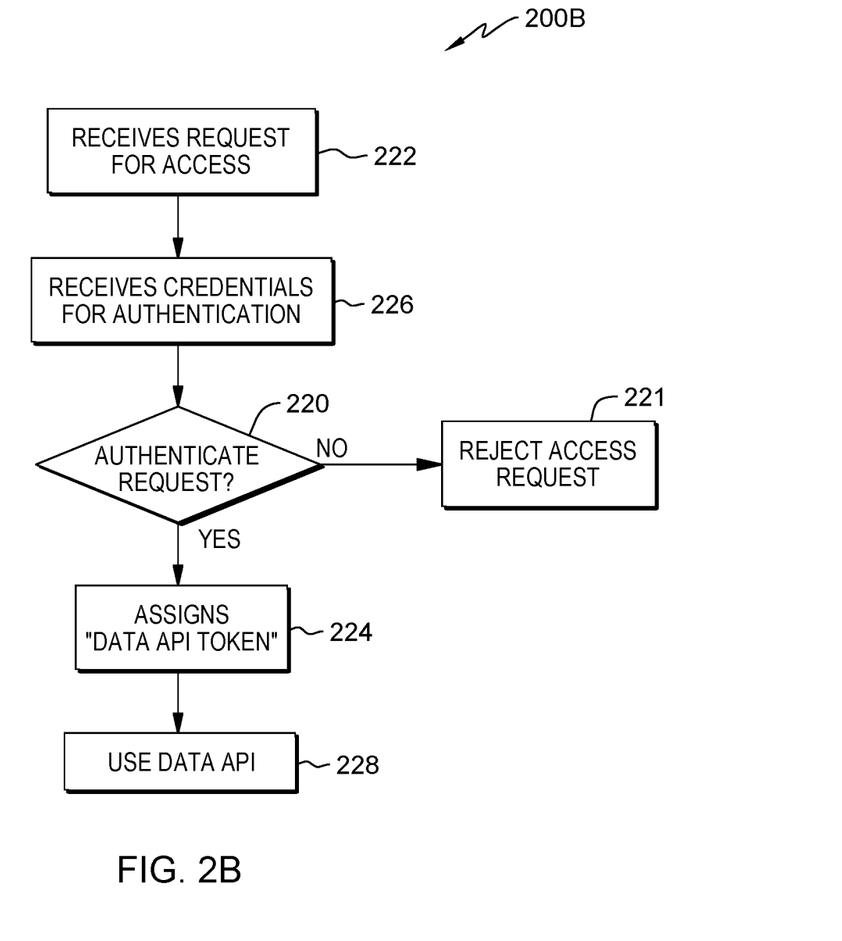
FIG. 2B is a flowchart, designated as 200B, depicting the operational steps of gaining access to a system based on the use of Data API environment (200A)
Figure 3A:
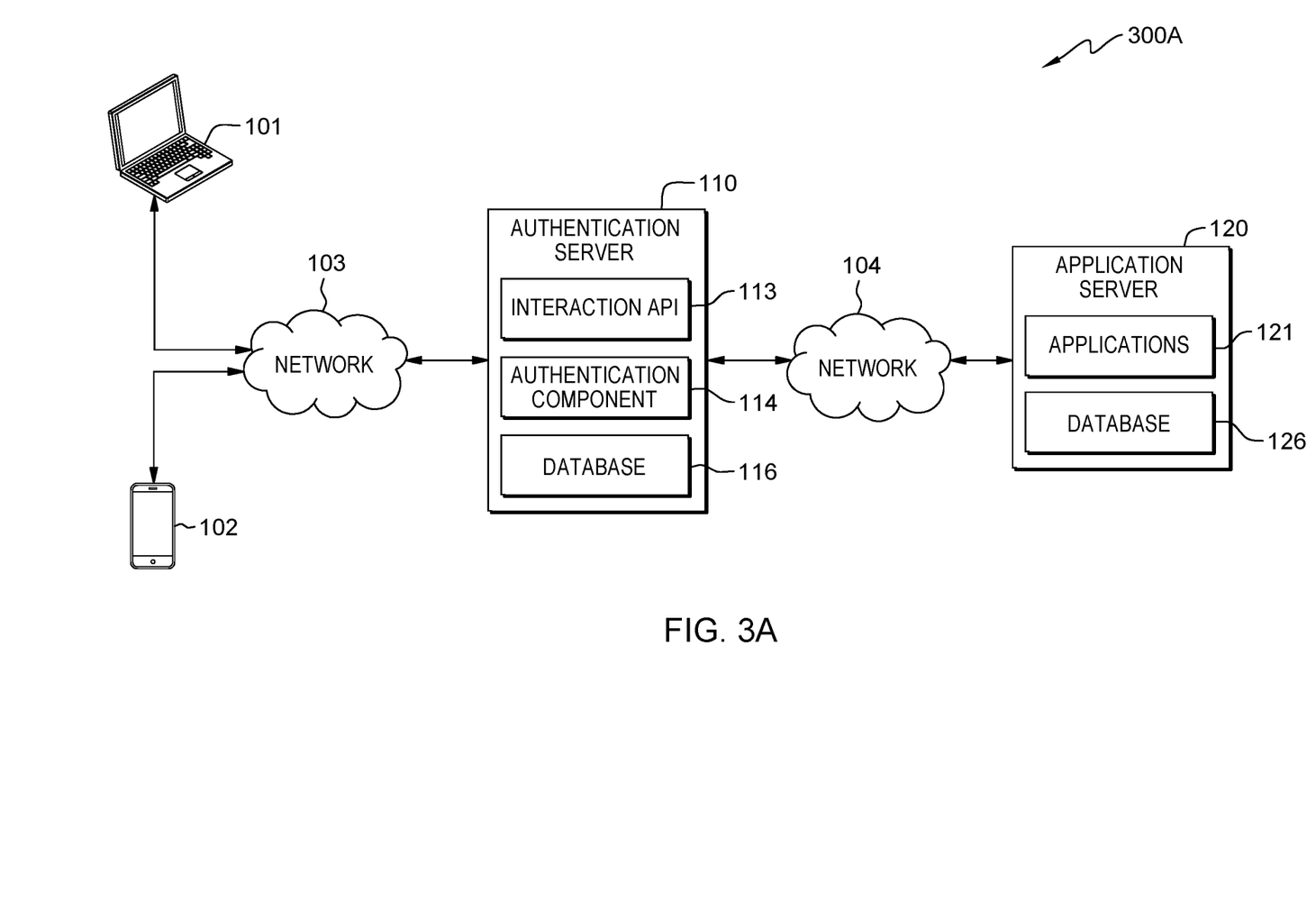
FIG. 3A is a functional block diagram illustrating the use of Interaction API environment, designated as 300A, in accordance with an embodiment of the present invention.

FIG. 1C is a functional block diagram illustrating the individual APIs (Data API 112 and Interaction API 113) residing on a single authentication server environment in accordance with another embodiment of the present invention. As previously presented in FIGS. 1A and 1B, both Data API 112 and Interaction API 113 were bundled into one authentication server (i.e., authentication server 110). However, other implementations can include each API residing by itself on its own authentication server. For example, Data API 112 can reside on authentication server 110 as depicted in FIG. 2B. In another example, Interaction API 113 can reside on authentication server 110, as depicted in FIG. 3A.

Figure 1D:
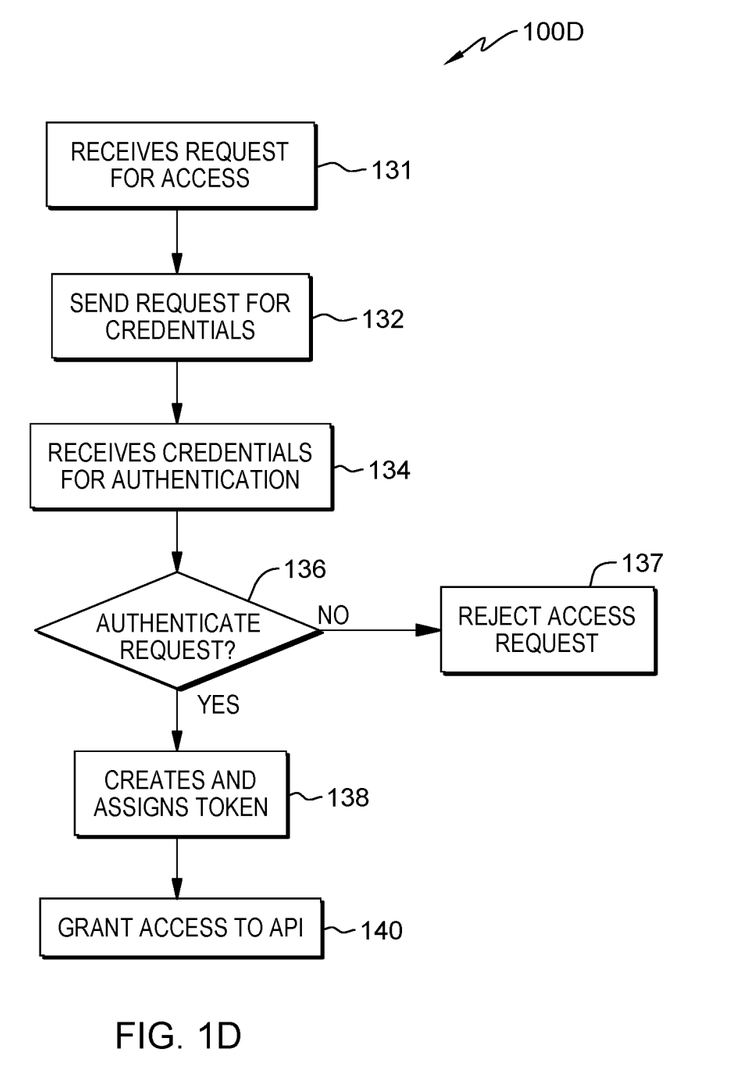
FIG. 1D is a flowchart, designated as 100D, depicting the operational steps of gaining access to a system based on the one portal access for two APIs environment (100A)

FIG. 1D is a flowchart, designated as 100D, depicting the operational steps of method for accessing data applications using a single portal.

As depicted, the operations steps start with one shared access point (e.g., IBM Cloud™) wherein access API 111, residing within authentication server 110, receives a request for access to either API. In an embodiment, access API 111 and/or authentication component 114 receives a request for access to the APIs (i.e., Data API 112 or Interaction API 113) from the user (step 131). For example, Floo Airline customer, Bob, would like to change his seat assignment on an upcoming flight and uses his mobile app. Bob invokes the Floo Airline application on his mobile device. The application requires him to logon before he can proceed to the seat selection of his flight. Therefore, Access API 111, based on Bob's activity on his mobile application, determines that Bob is requesting access to Interaction API 113.

In an embodiment, Access API 111 sends a request for credentials to the user (step 132). For example, Floo Airline app would ask Bob to login into the app with his username and password. It should be noted that authentication component 114 can also be used to request credentials from the user and perform other routine authentication processes.

In an embodiment, Access API 111 receives credentials for authentication from the user (step 134). Access API 111 receives, but is not limited to the following information from the user, a login credential (e.g., username, password, etc.) and a network location (e.g., Internet Protocol, cookies, domain names, etc.) of request from the user. For example, Bob (Floo Airline customer) would enter his username and password on the Floo Airline app from his mobile device.

In an embodiment, Access API 111 determines whether the received information (i.e., login and network location) is adequate for authentication (decision block 136). It is noted that the network location of the user can be used to determine whether the original request is from a secured network location (e.g., company VPN) or less secured network location (e.g., public computers). As previously mentioned, Interaction API 113 is less secure and is typically utilized by a client application. Any method known in the art can be used to determine authentication based on the received information. If Access API 111 determines that the received information is valid ("Yes" branch, decision block 136), then it will proceed to create and assign a token to the user (step 138). Otherwise, if Access API 111 and/or authentication component 114 determines that the received information is not adequate ("No" branch, decision block 136), then it will reject the user for API access (step 137).

In an embodiment, Access API 111 creates and assigns the requested API token (i.e., Interaction API token or Data API token) to the user (step 138). Any well-known method in the art can be utilized for token creation and assignment. In the same embodiment, the created token is only valid for one transaction by the user (e.g., completing his seat assignment). For example, Bob is trying to select his seat for an upcoming flight on Floo Airline. Access API 111 has already determined from step 131 that Bob is making a request to use Interaction API 113. Therefore, Access API 111 and/or authentication component 114 creates an Interaction API token and assigns it to Bob's session and/or transaction/activity. It is noted that "session" is time sensitive, but "transaction" is not bound by time but by task. In another embodiment, the created token may be subject to a time limitation and may expire after a predetermined time (i.e., session token). In an example, Bob's token may not expire until he has completed his transaction/activity (e.g., selecting his seat assignment and logging out of the app). The implementation of either using a session token or a transaction token is entirely dependent on the administrator. It is noted that Interaction API token and/or Data API token can either be a session token or a transaction token, depending on implementation.

In an embodiment, Access API 111 grants access to the API (i.e., Interaction API 113 or Data API 112) based on the received token (i.e., Interaction API token vs Data API token) (step 140). Furthermore, the user is allowed to access data specific for that API. For example, Bob is now allowed to use Interaction API 113 to select his seat assignment.

Figure 2A:
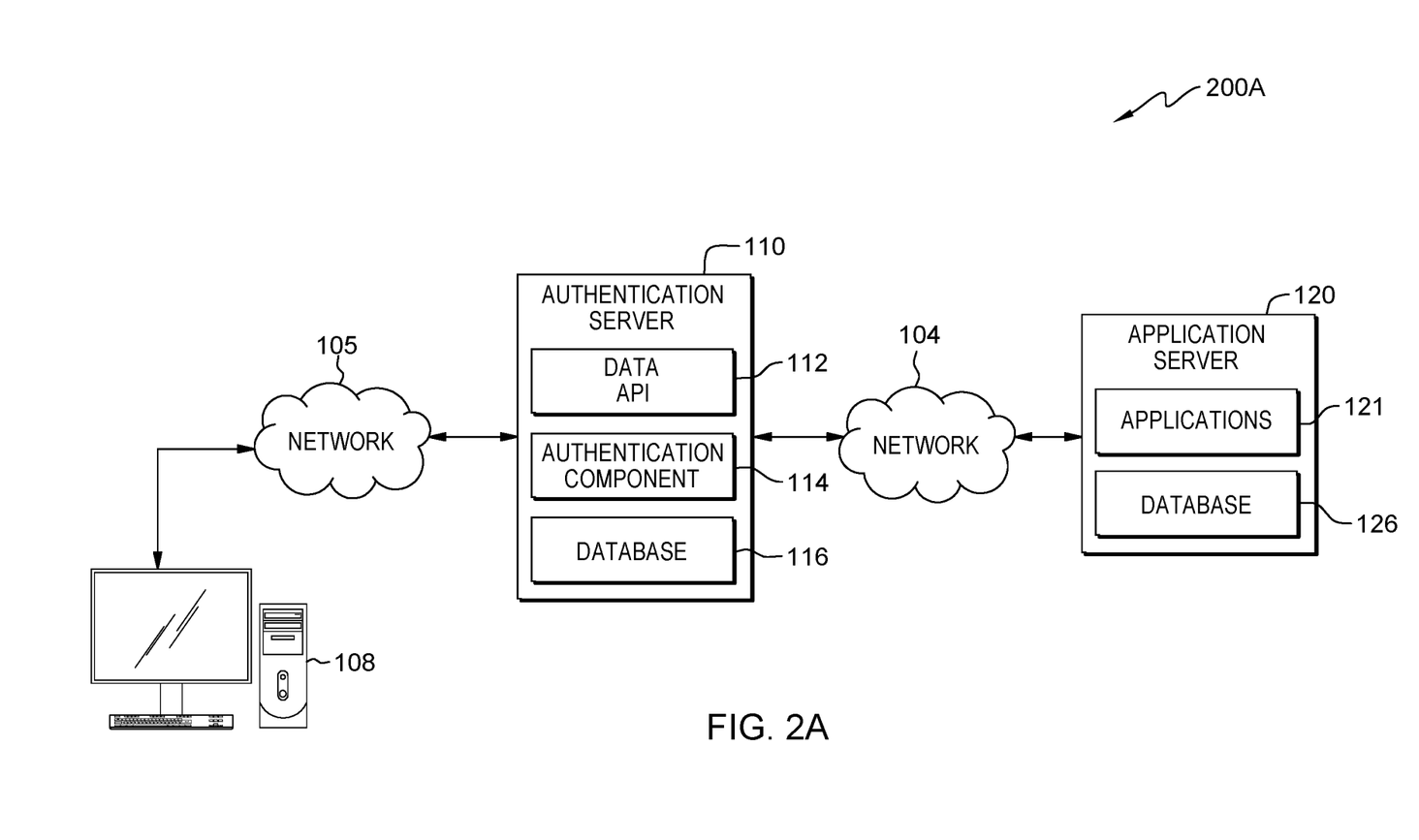
FIG. 2A is a functional block diagram illustrating the use of Data API environment, designated as 200A, in accordance with an embodiment of the present invention.

FIG. 2A is a functional block diagram illustrating the use of Data API environment, designated as 200A, in accordance with an embodiment of the present invention. Data API environment 200A includes authentication server 110 containing Data API 112, authentication component 114, application server 120 and secured computer 108, all interconnected over highly secure network 105 and private network 104.

The components depicted in FIG. 2A is similar to 1A with the following exceptions which will be described below.

Data API 112 can be called from a highly secure server within a highly secured network (i.e., highly secured network 105) to allow access to data as long as the caller authenticates using a "Data API token" and is granted access via ACLs. Furthermore, Data API 112 is called from a highly secure server/computer can use APIs that are not publicly available to increase security. These APIs are accessed from a server side and not from the customer, allowing access to users (e.g., admins or employees). To access from the data APIs, a server-side application needs to gain access to a different token that represents the calling server side application and the server side application needs to be allowed access to the profile data. As a result, while the blast radius of Data API 112 can be significant, it can be limited via the right ACLs. A "blast radius" is the extent/range of an exposure when a security breach occurs by a hacker.

Highly secured network 105 can be, for example, a telecommunications network, a local area network (LAN), a wide area network (WAN). In general, highly secured network 105 can be any combination of connections and protocols that can support communications between authentication server 110, application server 120, secured computer 108, network 104 and other computing devices (not shown) within Data API environment 200A. In this embodiment, highly secured network 105 resides within an internal or intranet network.

Secured computer 108 can be any electronic device or computing system capable of receiving, sending, and processing data. Secured computer 108 allows the users (or admins) to access the web services (or any other suitable applications) on application server 120 via authentication server 110. It is noted that secured computer 108 can have another layer of authentication for administrators or any users requiring stricter security.

FIG. 2B is a flowchart, designated as 200B, depicting the operational steps of gaining access to a system based on the Data API environment (200A).

In one embodiment, a user (i.e., Floo Airline employee) is attempting to utilize/call Data API 112. A request is received by Data API 112 (step 222). For example, Joe, a Floo Airline employee, is analyzing customer data in order to create a new sales promotion targeting certain customers. Joe, in his office, logs into his work computer which resides on highly secured network 105. Joe types in the web address of Floo Airline's customer database on his work computer. In the same embodiment, Data API 212 receives credentials for authentication (step 226) from the user (i.e., Joe). Data API 212 determines whether the request is from a user (e.g., customer) or an admin based on the received credentials. It should be noted that authentication component 114 can also be used to request credentials from the user and perform other routine authentication processes.

Data API 112 determines whether the employee's credentials were authenticated properly (decision block 220). For example, if the credentials received did not originate from Floo's employee authentication service, then the request will be rejected ("No" branch, decision block 220). The authentication of the credentials can be checked any method known in the art (e.g., HTTP authentication, etc.). If the credentials for authentication are valid and originated from the employee authentication service ("Yes" branch, decision block 220), then the Data API 112 will continue to serve the request by assigning an admin token (step 224). Once, the proper admin token has been assigned, the employee, may proceed to use Data API 112 (step 226) (i.e., allowed access to data granted by the call to Data API 212). For example, Joe, a Floo Airline employee, from within a highly secured network 105 logs into the system to access customer data with the correct credential and receives a specific token (i.e., data API token) allowing the use of Data API 112. Otherwise, if the credentials are not valid ("No" branch, decision block 220) then Data API 112 will reject the rest of the invoke/call to the API (step 221).

In another embodiment, Data API 112 can assign the data API token to Airline Floo's employee, for example, Joe. The REST APIs will continue to serve the request and will proceed to additional security steps (required because granting access to the overall Floo customer data is very sensitive). On the server side, a different set of programming functions are available, for example:

/customers/history/stats
/customers/currencies/

Those functions can be leveraged (e.g., by the marketing department) to find usage statistics of customers or perform analytics on customers who use euros. Furthermore, those APIs can be configured to be accessible only from within a highly secured server, and only with specifically scoped authentication tokens. For example, Floo Airlines's application can force each client requesting an API to have a different token, or that the token will be used only a few times before it expires. It should be noted that time-based token (i.e., session token) and transaction-based token (i.e., transaction token) can be dynamically set by the administrators.

FIG. 3A is a functional block diagram illustrating the single use of Interaction API, designated as 300A, in accordance with an embodiment of the present invention. Single use of Interaction API environment 300A includes authentication server 110 containing Interaction API 113, authentication component 114, application server 120, client computer 101 and mobile device 102, all interconnected over public network 103 and private network 104. The components depicted in FIG. 3A is similar to FIGS. 1A and 2A with the following exception (i.e., use of Interaction API 113) which will be described below.

Interaction API 113 can be called from a client app that has an end user's token. Interaction API 113 has a very limited blast radius because it uses an authenticated user's token. If this token is compromised, only that specific user's data is at risk. Other users and or admin capabilities of the system are not affected.

Figure 3B:
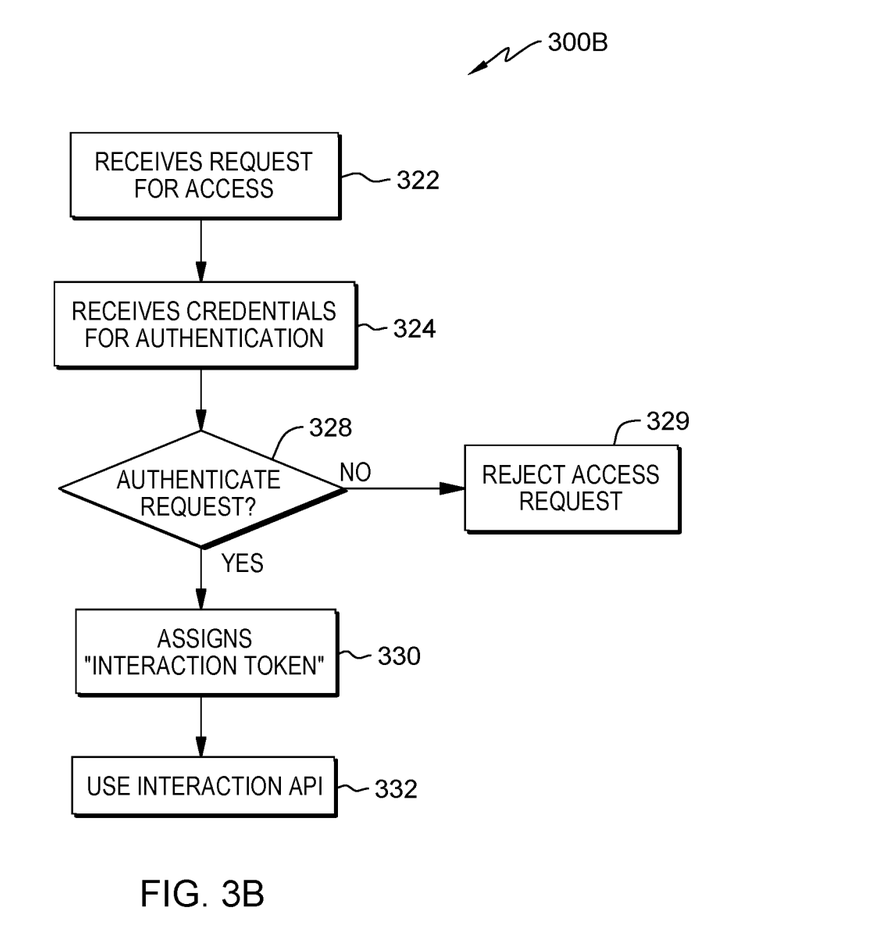
FIG. 3B is a flowchart, designated as 300B, depicting the operational steps of gaining access to a system based on the use of Interaction API environment (300A)

FIG. 3B is a flowchart, depicting operational steps of method for executing Interaction API 313, in accordance with an embodiment of the present invention.

In an embodiment, a user (e.g., Airline Floo customer) is attempting to utilize Interaction API 113. A request is received by Data API (step 322). In the same embodiment, Interaction API 113 receives credentials for authentication (step 324). It should be noted that authentication component 114 can also be used to request credentials from the user and perform other routine authentication processes.

Interaction API 113 determines whether the customer's credentials were authenticated properly (decision block 328). For example, if the credential did not originate from Floo's customer authentication service, then the request will be rejected ("No" branch, decision block 328). The credentials can be checked by any method known in the art (e.g., HTTP authentication, etc.). If the credential is valid and did originate from the customer authentication service ("Yes"

branch, decision block 328) then the Interaction API 113 will continue to serve the request by assigning an interaction API token. Otherwise, if the credential is not valid ("No" branch, decision block 328) then Interaction API 113 will reject the rest of the invoke/call to the API (step 329).

Interaction API 113 assigns an interaction API token to a user (e.g., Airline Floo's customer) (step 330). Once authenticated, the user can now access the data granted by Interaction API 113 (step 332).

In another embodiment, Interaction API 112 can assign the interaction API token to the customer. For example, a customer of Airline Floo wanted to recall his seat information before booking his next trip. Therefore, he uses his mobile application to view his last seat preference. To use those APIs, the customer will first need to authenticate with Floo's customer authentication service. This service will return to the application a token that represents a customer in Floo. Once authenticated, the customer can now access the APIs, for example:

/users/pref/currency
/users/search/history

If the customer compromises the authentication token or the login information, only the customer's attributes will be at risk.

Figure 4:
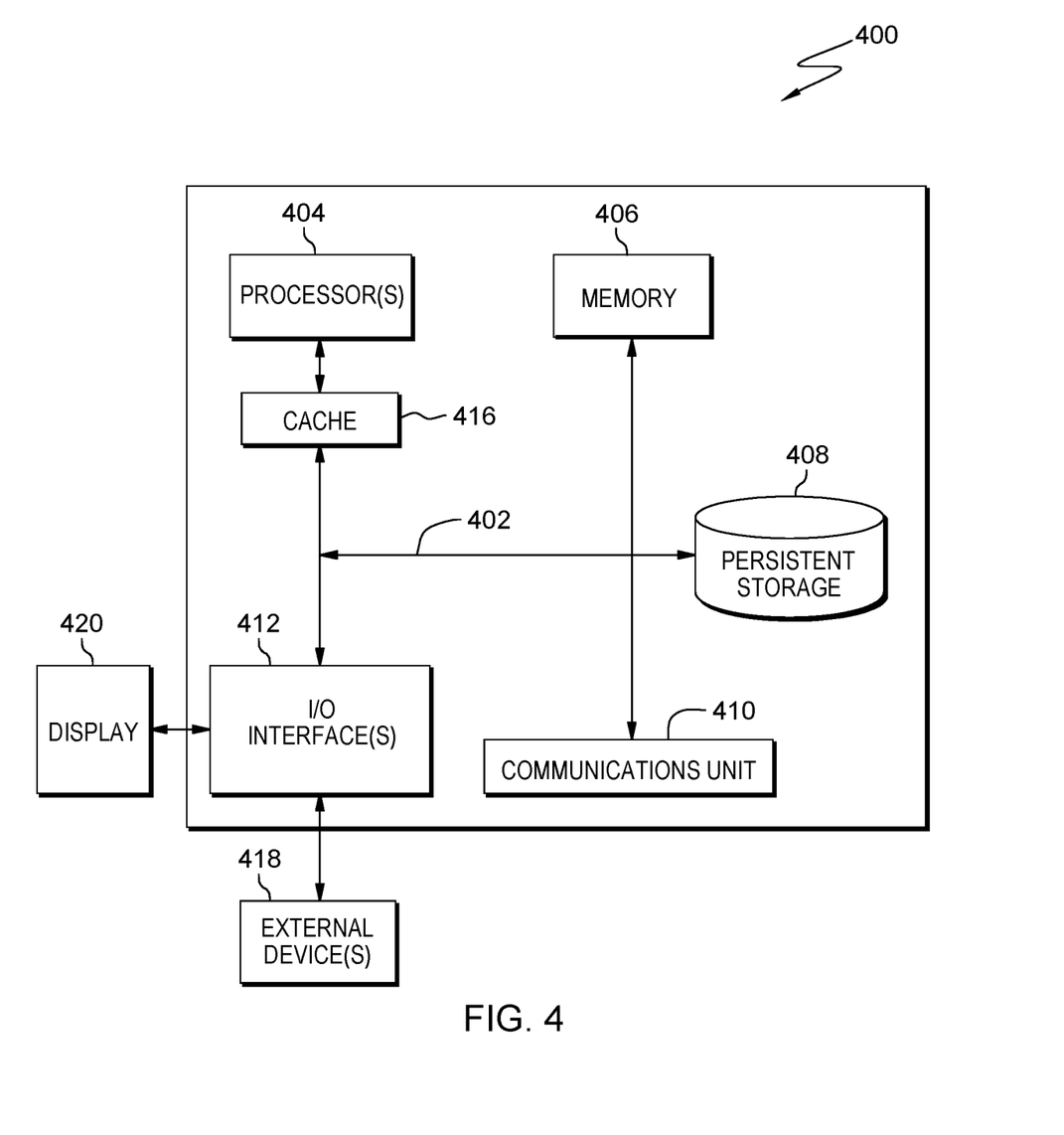
FIG. 4 depicts a block diagram, designated as 400, of components of the server computer executing the program within the one portal access for two APIs, FIG. 1A, in accordance with an embodiment of the present invention.

FIG. 4 depicts a block diagram, designated as 400, of components of the server computer executing the program within the one portal access for two APIs environment of FIG. 1A, FIG. 2A or FIG. 3A, in accordance with an embodiment of the present invention.

Authentication server 110 can include processor(s) 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data used to practice embodiments of the present invention, e.g., Access API 111, Data API 112, Interaction API 113 and database 116, can be stored in persistent storage 408 for execution and/or access by one or more of the respective processor(s) 404 of authentication server 110 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of mobile device 102, authentication server 110 or application server 120. In these examples, communications unit 410 includes one or more network interface cards. Communications unit 410 may provide communications through the use of either or both physical and wireless communications links. Access API 111, Data API 112, Interaction API 113 and database 116 may be downloaded to persistent storage 408 of authentication server 110 through communications unit 410.

I/O interface(s) 412 allows for input and output of data with other devices that may be connected to authentication server 110. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., Access API 111, Data API 112, Interaction API 113 and database 116 on authentication server 110, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor or the lenses of a head mounted display. Display 420 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for allowing API access for different types of users to an application, the computer implemented method comprising:

receiving, by one of more processors, a request for access to an API (Application Programming Interface) from a user;

sending, by the one of more processors, a request for a login credential to the user based on a type of API requested;

receiving, by the one of more processors, the login credential from the user;

authenticating, by the one of more processors, the login credential, further comprises:

receiving, by the one of more processors, a network location associated with the user;

receiving, by the one of more processors, the login credential;

validating, by the one of more processors, both the login credential and the network location;

determining, by the one of more processors, whether the received network location of the user is associated with a highly secured network location, wherein the highly secured network location is one of a company VPN (virtual private network) and a company intranet network;

responsive to determining the network location of the user is located on the highly secured network location, the user has access to an admin ACL (access control list) and the login and password is valid, assigning, by the one of more processors, a Data API token to the user, wherein the Data API token further comprises of a first REST (Representation Sate Transfer) API that has been configured to allow the user access only to administrator-related attributes of the application and the Interaction API token further comprises of a second REST API that has been configured to allow the user access to only client-related transactions of the application; and responsive to determining the network location of the user is not located on the highly secured network location, the user has access to a client ACL (access control list) and the login and password is valid, assigning, by the one of more processors, an Interaction API token to the user; and granting, by the one of more processors, the user access to the API based on the API token.

2. The method of claim 1, wherein the API comprises a data API and an interaction API.

3. The method of claim 1, wherein receiving the network location associated with the user further comprises:

determining, by the one of more processors, an IP (Internet Protocol) address of the user;

determining, by the one of more processors, a domain name associated with the user; and determining, by the one of more processors, a cookie associated with the user's browser.

4. The method of claim 1, wherein the administrator-related attributes further comprises of access to customer-sensitive data and wherein the client-related transactions further comprises of picking a seat preference and storing credit card information.

5. The method of claim 1, sending a request for a login credential to the user further comprising:

transmitting, by the one of more processors, a request to a mobile device of the user; and transmitting, by the one of more processors, the request to a client computing device of the user.

6. The method of claim 1, wherein the predetermined network location further comprises a highly secured network location and a public network location.

7. A computer program product for allowing API access for different types of users to an application, the computer program product comprising:

one or more computer readable storage devices and program instructions stored on the one or more computer readable storage devices, the stored program instructions comprising:

program instructions to receive a request for access to an API (Application Programming Interface) from a user;

program instructions to send a request for a login credential to the user based on a type of API requested;

program instructions to receive the login credential from the user;

program instructions to authenticate the login credential, further comprises:

program instructions to receive a network location associated with the user;

program instructions to receive the login credential; and program instructions to validate both the login credential and the network location;

program instructions to determine whether the received network location of the user is associated with a highly secured network location, wherein the highly secured network location is one of a company VPN (virtual private network) and a company intranet network;

responsive to determining the network location of the user is located on the highly secured network location, the user has access rights to an admin ACL (access control list) and the login and password is valid, program instructions to assign a Data API token to the user, wherein the Data API token further comprises of a first REST (Representation Sate Transfer) API that has been configured to allow the user access only to administrator-related attributes of the application and the Interaction API token further comprises of a second REST API that has been configured to allow the user access to only client-related transactions of the application; and responsive to determining the network location of the user is not located on the highly secured network location, the user has access rights to a client ACL (access control list) and the login and password is valid, program instructions to assign an Interaction API token to the user;

program instructions to grant the user access to the API based on the API token.

8. The computer program product of claim 7, wherein program instructions to receive the network location associated with the user further comprising:

program instructions to determine an IP (Internet Protocol) address of the user;

program instructions to determine a domain name associated with the user; and program instructions to determine a cookie associated with the user's browser.

9. The computer program product of claim 7, wherein the administrator-related attributes further comprises of access to customer-sensitive data and wherein the client-related transactions further comprises of picking a seat preference and storing credit card information.

10. The computer program product of claim 7, wherein, program instructions to send a request for a login credential to the user further comprising:

program instructions to transmit a request to a mobile device of the user; and program instructions to transmit the request to a client computing device of the user.

11. The computer program product of claim 7, wherein the API comprises a data API and an interaction API.

12. The computer program product of claim 7, wherein the predetermined network location further comprises a highly secured network location and a public network location.

13. A computer system for allowing API access for different types of users to an application, the computer system comprising:

one or more computer processors;

one or more computer readable storage devices;

program instructions stored on the one or more computer readable storage devices for execution by at least one of the one or more computer processors, the stored program instructions comprising:

program instructions to receive a request for access to an API (Application Programming Interface) from a user;

program instructions to send a request for a login credential to the user based on a type of API requested;
program instructions to receive the login credential from the user;
program instructions to authenticate the login credential, further comprises:
  program instructions to receive a network location associated with the user;
  program instructions to receive the login credential; and
  program instructions to validate both the login credential and the network location;
program instructions to determine whether the received network location of the user is associated with a highly secured network location, wherein the highly secured network location is one of a company VPN (virtual private network) and a company intranet network;
responsive to determining the network location of the user is located on the highly secured network location, the user has access rights to an admin ACL (access control list) and the login and password is valid, program instructions to assign a Data API token to the user, wherein the Data API token further comprises of a first REST (Representation Sate Transfer) API that has been configured to allow the user access only to administrator-related attributes of the application and the Interaction API token further comprises of a second REST API that has been configured to allow the user access to only client-related transactions of the application; and
responsive to determining the network location of the user is not located on the highly secured network location, the user has access rights to a client ACL (access control list) and the login and password is valid, program instructions to assign an Interaction API token to the user;
program instructions to grant the user access to the API based on the API token.

14. The computer system of claim 13, wherein program instructions to receive the network location associated with the user further comprising:
  program instructions to determine an IP (Internet Protocol) address of the user;
  program instructions to determine a domain name associated with the user; and
  program instructions to determine a cookie associated with the user's browser.

15. The computer system of claim 13, wherein the administrator-related attributes further comprises of access to customer-sensitive data and wherein the client-related transactions further comprises of picking a seat preference and storing credit card information.

16. The computer system of claim 13, wherein, program instructions to send a request for a login credential to the user further comprising:
  program instructions to transmit a request to a mobile device of the user; and
  program instructions to transmit the request to a client computing device of the user.

17. The computer system of claim 13, wherein the API comprises a data API and an interaction API.

* * * * *